United States Patent
Klok et al.

(10) Patent No.: US 12,427,476 B2
(45) Date of Patent: Sep. 30, 2025

(54) CONTINUOUS PROCESS TO TREAT A HYDROGEN SULPHIDE COMPRISING GAS

(71) Applicant: PAQELL B.V., Utrecht (NL)

(72) Inventors: Johannes Bernardus Maria Klok, Rhenen (NL); Frederikus De Rink, Amersfoot (NL); Karine Kiragosyan, Leeuwarden (NL); Pawel Roman, Leeuwarden (NL); Albert Joseph Hendrik Janssen, Landgraaf (NL); Karel Keesman, Amersfoot (NL)

(73) Assignee: PAQELL B.V., Utrecht (NL)

( * ) Notice: Subject to any disclaimer, the term of this patent is extended or adjusted under 35 U.S.C. 154(b) by 772 days.

(21) Appl. No.: 17/783,778

(22) PCT Filed: Dec. 10, 2020

(86) PCT No.: PCT/EP2020/085569
§ 371 (c)(1),
(2) Date: Jun. 9, 2022

(87) PCT Pub. No.: WO2021/116303
PCT Pub. Date: Jun. 17, 2021

(65) Prior Publication Data
US 2023/0009711 A1    Jan. 12, 2023

(30) Foreign Application Priority Data

Dec. 13, 2019 (NL) .................................... 2024456

(51) Int. Cl.
*B01D 53/84* (2006.01)
*B01D 53/46* (2006.01)

(52) U.S. Cl.
CPC ............. *B01D 53/84* (2013.01); *B01D 53/46* (2013.01); *B01D 2251/102* (2013.01);
(Continued)

(58) Field of Classification Search
CPC ........ B01D 53/48; B01D 53/52; B01D 53/84; B01D 53/96; C02F 3/2806; C02F 3/2846; C02F 3/301; C02F 3/345
See application file for complete search history.

(56) References Cited

FOREIGN PATENT DOCUMENTS

| CN | 103977703 A | 8/2014 |
|---|---|---|
| CN | 209221841 U | 8/2019 |

(Continued)

*Primary Examiner* — Sharon Pregler
(74) *Attorney, Agent, or Firm* — NIXON PEABODY LLP; Ronald I. Eisenstein; Nicole D. Kling

(57) ABSTRACT

The invention is directed to a continuous process to treat a hydrogen sulphide comprising gas comprising the following steps: (a) contacting the hydrogen sulphide comprising gas with an aqueous alkaline solution further comprising sulphide oxidising bacteria thereby obtaining a loaded aqueous solution comprising sulphide compounds and sulphide oxidising bacteria. (b) contacting the loaded aqueous solution with an oxygen comprising gas to regenerate the sulphide oxidising bacteria to obtain a liquid effluent comprising regenerated sulphide oxidising bacteria which is partly used as the aqueous alkaline solution in step (a). (c) separating elemental sulphur as prepared by the sulphide oxidising bacteria in steps (a) and (b) from the loaded aqueous solution of step (a) and/or from the liquid effluent of step (b) and wherein the consumption of oxygen in step (b) is measured and wherein the supply of oxygen in step (b) is controlled by the measured consumption of oxygen.

15 Claims, 2 Drawing Sheets

Figure 1:
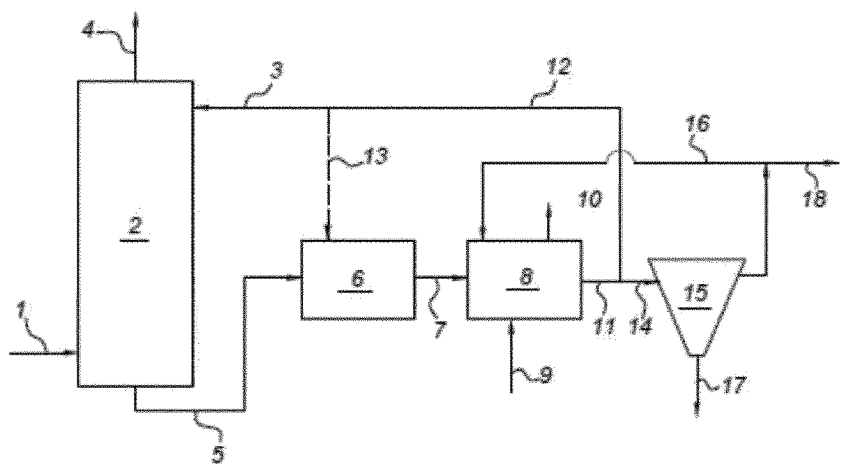

(52) U.S. Cl.
CPC .. *B01D 2251/304* (2013.01); *B01D 2251/306* (2013.01); *B01D 2251/606* (2013.01); *B01D 2251/95* (2013.01); *B01D 2257/304* (2013.01); *B01D 2257/306* (2013.01)

(56) References Cited

FOREIGN PATENT DOCUMENTS

| | | |
|---|---|---|
| EP | 3034157 A1 | 6/2016 |
| NL | 8801009 A | 11/1989 |
| WO | 2015114069 A1 | 8/2015 |

CONTINUOUS PROCESS TO TREAT A HYDROGEN SULPHIDE COMPRISING GAS

CROSS-REFERENCE TO RELATED APPLICATIONS

This application is a 35 U.S.C. § 371 National Phase Entry Application of International Application No. PCT/EP2020/085569 filed Dec. 10, 2020, which designates the U.S. and claims benefit under 35 U.S.C. § 119 (a) of NL Application No. 2024456 filed Dec. 13, 2019, the contents of which are incorporated herein by reference in their entireties.

The invention is directed to a continuous process to treat a hydrogen sulphide comprising gas. The process comprises the following steps (a), (b) and (c), wherein step (a) the hydrogen sulphide comprising gas is contacted with an aqueous alkaline solution further comprising sulphide oxidising bacteria thereby obtaining a loaded aqueous solution comprising sulphide compounds and sulphide oxidising bacteria. In a step (b) the loaded aqueous solution is contacted with an oxygen comprising gas to regenerate the sulphide oxidising bacteria to obtain a liquid effluent comprising regenerated sulphide oxidising bacteria which is partly used as the aqueous alkaline solution in step (a). In a step (c) elemental sulphur as prepared by the sulphide oxidising bacteria in steps (a) and (b) is separated from the loaded aqueous solution of step (a) and/or from the liquid effluent of step (b).

Such a process is described in WO9630110. The described biodesulfurization process is a biotechnological process, which removes $H_2S$ from sour gas streams and subsequently converts it into predominantly elemental sulfur by sulphide oxidising bacteria. In such a process the amount of oxygen ($O_2$) that is supplied to step (b) may also play a role in the formation of undesired sulphate as shown in the following equations:

$$H_2S + \tfrac{1}{2}O_2 \rightarrow S^0 + H_2O \qquad (1)$$

$$S^0 + 1\tfrac{1}{2}O_2 + H_2O \rightarrow SO_4^{2-} + H^+ \qquad (2)$$

To enable a high selectivity for formation of elemental sulphur, the oxygen supply to step (b) is carefully controlled. Because the desired dissolved oxygen concentration for optimal sulphur formation rates are below or close to their detection limits, oxygen supply is controlled based on the measurement of the redox potential of the aqueous alkaline solution, as described in EP0958251B.

EP0958251 describes a process wherein the selectivity of sulphide oxidising reaction towards sulphur is optimized by adjusting the redox potential of the aqueous alkaline solution at a value of below −300 mV (against an Ag/AgCl reference electrode) and preferably between −320 and −360 mV. According to this publication the redox potential is a measure of the dissolved sulphide content in the aqueous solution at a certain pH. The process is controlled such that when the measured redox potential rises, i.e. becomes less negative, less oxygen is supplied to step (b) and when the redox potential decreases, more oxygen is supplied to step (b).

In many commercial biodesulfurization processes according to the process described above a control strategy making use of the redox potential results in operational stability and reliability. However it has been found that when the content of hydrogen sulphide in the gas stream varies oscillations in the measured redox potential may occur. This in turn results in instability of the process and subsequent overdosage of oxygen. As a result, instead of sulphur formation, more sulphide is converted into sulphate which is unwanted due to the requirement of NaOH and water. It has also been found that thiol compounds, which could be present in the gas, and/or diorgano polysulfanes compounds, which may form in the aqueous solution, influence the redox measurement, resulting in incorrect control and lower selectivity to sulphur as described in an article titled Selection and Application of Sulfide Oxidizing Microorganisms Able to Withstand Thiols in Gas Biodesulfurization Systems and published in Environ. Sci. Technol. 2016, 50, 23, 12808-12815.

It is an object of the present invention to provide a biodesulfurization process which over time has a high selectivity to sulphur.

This is achieved by the following process. A continuous process to treat a hydrogen sulphide comprising gas comprising the following steps:

(a) contacting the hydrogen sulphide comprising gas with an aqueous alkaline solution further comprising sulphide oxidising bacteria thereby obtaining a loaded aqueous solution comprising sulphide compounds and sulphide oxidising bacteria, (b) contacting the loaded aqueous solution with an oxygen comprising gas to regenerate the sulphide oxidising bacteria to obtain a liquid effluent comprising regenerated sulphide oxidising bacteria which is partly used as the aqueous alkaline solution in step (a), (c) separating elemental sulphur as prepared by the sulphide oxidising bacteria in steps (a) and (b) from the loaded aqueous solution of step (a) and/or from the liquid effluent of step (b) and wherein the consumption of oxygen in step (b) is measured and wherein the supply of oxygen in step (b) is controlled by the measured consumption of oxygen.

Applicants found that the process control according to this process resulted in a more stable process in terms of selectivity to sulphur when compared to a process which is controlled by means of measuring the redox potential as was the standard control method for commercially operated biodesulfurization processes for the last 35 years. The improved stability was especially noted when the supply of hydrogen sulphide in the process was varied over time. The improved stability was also especially noted when a thiol compound, ethanethiol, was present in the gas stream. More advantages will be described in combination with some preferred embodiments below.

The hydrogen sulphide comprising gas may be any gas comprising such compound. A gas comprising of substantially only hydrogen sulphide optionally in admixture with traces of carbon dioxide may be used. The hydrogen sulphide may be in admixture with other gaseous hydrocarbons, such as for example methane, ethane, propane and/or higher boiling hydrocarbons and with nitrogen, hydrogen, carbon dioxide and/or carbon monoxide. The process is also suited to process a gas which in addition also comprises mercaptans and/or other sulphur compounds, for example carbonyl sulphide. The invention is especially suited for a gas which further comprises thiol compounds. Examples of thiol compounds are methanethiol, ethanethiol and propanethiol. The thiol compounds may form diorgano polysulfanes compounds in the process according to the invention. The thiol compounds and the diorgano polysulfanes compounds may influence the redox measurement. Examples of diorgano polysulfanes compounds which may be formed are dimethyl disulfide, dimethyl trisulfide, dimethyl tetrasulfide. Such a gas may be natural gas, bio-gas, refinery off gas, synthesis gas, geothermal gas, landfill gas or acid gas obtained in an amine gas treating process.

The process is especially suited when the supply of hydrogen sulphide in the gas varies in time. In such a situation a process control using the redox potential measurement may tend to end in a condition wherein the selectivity to sulphur decreases significantly, whereas the present process is able to maintain a high selectivity to sulphur. More suitably a process having a varying hydrogen sulphide supply is wherein the measured supply of hydrogen sulphide in the hydrogen sulphide gas comprising gas varies over a time period of 32 hours at least between plus 20% and minus 20% relative to the average supply in that period.

When in this description reference is made to bisulphide or sulphide the total of all of the following dissolved compounds, dihydrogen sulphide, bisulphide, sulphide and polysulphide is meant.

In step (a) the hydrogen sulphide comprising gas is contacted with an aqueous alkaline solution further comprising sulphide oxidising bacteria under anaerobic conditions and at a temperature of suitably between from 10° C. to 48° C., preferably of from 20° C. to 45° C. and more preferably of from 35° C. to 40° C. at a pressure in the range of from 0 bara to 100 bara, preferably of from atmospheric pressure to 80 bara. A loaded aqueous solution comprising sulphide compounds and sulphide oxidising bacteria is obtained. Step (a) may be performed by injecting a hydrogen sulphide comprising gas directly into the aqueous alkaline solution when the gas comprises substantially of hydrogen sulphide. All of the hydrogen sulphide will dissolve into the aqueous solution and react according to the process here described. Step (a) is suitably performed by means of an absorption process when the hydrogen sulphide comprising gas further is comprised of other gaseous compounds as described above. Such an absorption process is typically performed in an absorption or contacting column where gas and liquid flow counter-currently. Suitably the absorption process is performed in a vertical column wherein continuously the hydrogen sulphide comprising gas is fed to the column at a lower position of the column and the aqueous solution comprising sulphide oxidising bacteria is continuously fed to a higher position of the column such that a substantially upward flowing gaseous stream contacts a substantially downwards flowing aqueous solution stream. At the upper end a treated gas having a lower content in hydrogen sulphide is obtained. The column is further provided with an outlet for the loaded aqueous solution at its lower end and an outlet for treated gas at its upper end.

The aqueous alkaline solution may be any liquid alkaline absorbent known to be suitable for absorption of hydrogen sulphide. Examples of suitable liquid alkaline absorbents are carbonate, bicarbonate and/or phosphate solutions and more preferably the aqueous solution is a buffered solution further comprising sodium carbonate and sodium bicarbonate or potassium carbonate and potassium bicarbonate or their mixtures. The pH of the liquid aqueous alkaline solution is preferably in the range of from 7 to 10, more preferably of from 7.5 to 9.5. It will be appreciated that in downward direction of the column, the pH of the absorption liquid will decrease due to absorption of acidic compounds from the gas stream, in particular hydrogen sulphide and some carbon dioxide if present. The pH of the loaded aqueous solution obtained in step (a) will be typically lower than the pH of the aqueous solution provided to the absorption column. The pH of the loaded aqueous solution obtained in step (a) may be as low as 6.5 and is preferably in the range of from 6.5 to 9.0.

Step (a) is preferably performed under anaerobic conditions in step (a). These conditions are achieved by performing step (a) in the absence of molecular oxygen, preferably also in the absence of other oxidants such as for example nitrate. By cin the absence of molecular oxygen' is meant that the concentration of molecular oxygen in the aqueous solution in step (a) is at most 10 μM molecular oxygen, preferably at most 1 μM, more preferably at most 0.1 μM molecular oxygen.

The sulphide oxidising bacteria as present in step (a) may be any sulphide oxidising bacteria, preferably sulphide oxidising bacteria of the genera *Halothiobacillus, Thioalkalimicrobium, Thioalkalispira, Thioalkalibacter, Thioalkalivibrio, Alkalilimnicola*, and related bacteria. The sulphide oxidising bacteria as present in step (a) are comprised of the regenerated sulphide oxidising bacteria as obtained in step (b). It has been found that when such regenerated sulphide oxidising bacteria are present in the aqueous alkaline solution under the anaerobic conditions and temperature range a very effective absorption of hydrogen sulphide results in step (a). The content of regenerated sulphide oxidising bacteria, based on nitrogen content, in the aqueous alkaline solution in step (a) is preferably greater than 5 mg N/L and lower than 1000 mg N/L and more preferably between 25 and 200 mg N/L.

The loaded aqueous solution as obtained in step (a) comprises dissolved sulphide, some elemental sulphur as produced by the sulphide oxidising bacteria in step (a) and sulphide oxidising bacteria loaded with a bisulphide compound. The combined concentration of bisulphide and the optional elemental sulphur in the loaded aqueous solution obtained in step (a) (expressed as sulphur) may be up to 20 grams per litre. Preferably this combined concentration in the loaded aqueous solution is in the range of from 100 mg/L to 15 g/L, more preferably of from 150 mg/L to 10 g/L. The aqueous solution may further comprise sulphate and thiosulphate and trace compounds, such as for example iron, copper or zinc, as nutrients for the sulphide oxidising bacteria.

Suitably the loaded aqueous solution as obtained in step (a) is kept in a step (a1) under anaerobic conditions for at least a time sufficient to lower the concentration of dissolved bisulphide to below 5 mM. The anaerobic conditions are suitably as described above for step (a). The residence time of the sulphide oxidising bacteria in step (a1) is preferably at least 3 minutes, more preferably at least 5 minutes, more preferably at least 10 minutes. The maximum residence time is not critical, but for practical reasons, the residence time is preferably at most 2 hours, more preferably at most 1 hour. Step (a1) may be suitably be performed in a first bioreactor. The temperature in step (a1) may be lower or higher than the temperature in step (a). However it is preferred to avoid any on-purpose cooling or heating of the loaded aqueous solution of step (a) and therefore the temperature in step (a1) will be about the same as in step (a). The pressure in step (a1) may range from 0 bara to 100 bara, more preferably of from atmospheric pressure to 80 bara. The pressure in step (a) and step (a1) are suitably the same or substantially in the same order of magnitude. The pH in step (a1) is suitably between 7 and 10, more preferably between 7.5 and 9.5.

In step (a) and optional step (a1) suitably more than 30 mol %, preferably more than 50 mol % and even more preferably more than 90 mol % of the dissolved bisulphide is removed from the aqueous solution by biological remediation by the sulphide oxidising bacteria. In step (a) and optional step (a1) elemental sulphur is formed by selective oxidation of bisulphide, probably via polysulphide as intermediate product, to elemental sulphur. The loaded aqueous solution of step (a) and/or the solution obtained in step (a1) may be directly supplied to step (b) for regeneration of the sulphide oxidising bacteria, i.e. to bring the bacteria in an oxidised state. By directly supplied is here meant that no intermediate process step is performed with the object to remove elemental sulphur and/or sulphide oxidising bacteria from the first liquid effluent. Optionally elemental sulphur may be removed from these aqueous solutions. In such a step some of the sulphide oxidising bacteria may also be removed. However it is preferred to avoid the loss of sulphide oxidising bacteria in such a step and ensure that the majority of these bacteria are provided to step (b).

Preferably, the aqueous solution obtained in step (a) or optional step (a1) as provided to step (b) comprises less than 5 mM dissolved bisulphide, more preferably is essentially free of dissolved bisulphide. The low content of dissolved bisulphide is advantageous to avoid the thiosulphate formation under the aerobic conditions of step (b). It is further believed that the sulphide content avoids the growth of the bacteria population which seem to be responsible for the formation of sulphate in either step (a) or (b) and avoids the chemical oxidation to thiosulphate.

In step (b) the loaded aqueous solution of step (a) and/or optional step (a1) is contacted with an oxygen comprising gas, preferably air, to regenerate the sulphide oxidising bacteria to obtain a liquid effluent comprising regenerated sulphide oxidising bacteria. The oxygen comprising gas may be supplied in any suitable way, preferably by supplying the gas to a second bioreactor. The oxygen comprising gas may be any gas comprising oxygen, for example air, oxygen enriched air and mixtures of recycled vented gas and fresh air or oxygen enriched air.

Preferably the temperature in step (b) is in the range of the temperature of step (a) and optional step (a1) and preferably from 10 to 48° C. and more preferably of from 35 to 45° C. The pressure may be between 0 bara and 10 bara, more preferably from atmospheric pressure to 5 bara, even more preferably at atmospheric pressure.

The elemental sulphur may be separated from the loaded aqueous solution while performing step (a) and/or step (a1) and/or after performing step (a) and before performing step (b). Preferably the elemental sulphur as formed in step (a) and in option step (a1) is suitably isolated from the aqueous solution as obtained in step (b). This isolation of elemental sulphur may be performed by any means known in the art, such as for example by means of sedimentation or other means for solid-liquid separation. Preferably elemental sulphur is recovered by taking part of the aqueous solution obtained in step (b) and isolating elemental sulphur from that part to obtain a sulphur-depleted effluent. Part of the sulphur depleted effluent may be recycled to step (b) and part of the sulphur depleted effluent may be purged.

Although the formation of undesired higher oxidised sulphur compounds such as sulphate and thiosulphate are importantly reduced compared to prior art biological sulphide oxidation processes, some higher oxidised sulphur compounds may still be formed, in particular in step (b). In order to avoid undesired built-up of higher oxidised sulphur compounds in a continuously operated process, part of the liquid effluent of step (b) or part of the sulphur-depleted effluent is purged, for example as described above. Such a purge stream, also referred to as a bleed stream, will preferably be subjected to a membrane separation step in order to separate regenerated sulphide oxidising bacteria from the bleed stream. In the membrane separation a retentate stream comprising sulphide oxidising bacteria and a permeate stream that is essentially free of sulphide oxidising bacteria is obtained. The retentate stream is recycled to the process and the permeate stream is purged from the process.

In the membrane separation step, any suitable membrane may be used. Preferably, ultra-filtration membranes are used. Because in the process according to the invention the formation of higher oxidised sulphur compounds is very much reduced the purge may be relatively small. Applicants found the above described membrane separation may even be omitted. This because the loss of sulphide oxidising bacteria via the purge is compensated by the growth of the bacteria population in the process.

In step (b), a liquid effluent is obtained that comprises elemental sulphur and regenerated sulphide oxidising bacteria. Suitably part of this liquid effluent is used as the aqueous solution in step (a) and part of the liquid effluent as obtained in step (b) is contacted with the loaded aqueous solution in step (a1).

In a most simple embodiment of the process of this invention the oxygen comprising gas is air. Because the oxygen content in air is known and the flow of the air is set at a point in time the consumption of oxygen in step (b) may be easily determined. The consumption of oxygen is then determined based on the measurement of the oxygen content in a gas flow as discharged from step (b). This gas flow may be measured in a discharge conduit leaving a reactor vessel in which step (b) takes place or may be measured in the gas headspace of such a reactor. The oxygen consumption is then determined using this content of oxygen, preferably in combination with a known air flow supply rate and air flow discharge rate. The oxygen content in the gaseous phase may be measured using known techniques such as by using a fiber-optic oxygen probe PSt 3 as obtainable from PreSens Precision Sensing GmbH, Regensburg, Germany.

The oxygen consumption may also be measured by measuring the oxygen content in the oxygen comprising gas as provided to step (b) and the content of oxygen in the gas flow as being discharged from step (b). The oxygen consumption may then be derived from the difference in these measured oxygen contents. This may be the preferred method when the content of oxygen as supplied to step (b) varies, for example as a result of a recycle of vented gas from this process to the air supply.

Using oxygen consumption has been found a useful method of controlling the process. A disadvantage of this method is that it controls the oxygen flow in reaction of a measured oxygen consumption and thus always controls the process in a feedback loop manner. Applicants found that the process may be even better controlled when also the supply of hydrogen sulphide as present in the hydrogen sulphide comprising gas is measured. Variations in this supply of hydrogen sulphide may influence how the continuous process reacts. By keeping a ratof measured oxygen consumption in step (b) and measured hydrogen sulphide supplied in step (a) at a constant set value by varying the supply of oxygen to step (b) a better controlled process is obtained. Preferably the preset value for the molar supply ratio ($O_2$/$H_2S$ supply ratio) of oxygen and hydrogen sulphide is between 0.4 and 0.8 and more preferably between 0.5 and 0.7 is chosen as a set value for this control. By using a measured supply of hydrogen sulphide to step (a) and the measurement of the oxygen consumption a feedforward-feedback type of control is achieved.

The process may be performed by choosing a setpoint for the value for the molar ratio of measured oxygen consumption in step (b) and measured hydrogen sulphide supplied in step (a). When the measured ratio decreases, i.e. drops below the setpoint value, more oxygen will be supplied to step (b) in order to increase this ratio back to its set chosen value. Other way around, when the measured ratio increases less oxygen is supplied to step (b) in order to decrease the measured ratio back to its set chosen value.

Preferably, when the sulfide loading to the system is known, also feedforward control of air dosing can be included in the control scheme. Based on the measured perturbations of sulfide load entering the overall system in step (a) and time delay based on the liquid flow rates and volumes of the process, it can be calculated what the sulfide loading rate of step (b) will be. Hence, the control signal of the oxygen supply can be pre-defined.

Preferably the flow of the gas as is supplied to step (a) is measured in terms of volume or mass per time period and a content of hydrogen sulphide is measured expressed in mass or mol per volume of gas or per mass of gas. The content of hydrogen sulphide in the gas may be measured by means of well-known techniques such as by means of gas chromatography. The feed gas flow rate and content of hydrogen sulphide in the gas will provide a measure for the supply of hydrogen sulphide to step (a).

The control of the process according to the present invention has been found to operate well within a certain operating window. This operating window may be described by the redox potential of the aqueous solution, wherein the process control is performed when the redox potential is within a set range. Preferably the supply of oxygen to step (b) is controlled by the redox potential when a measured redox potential of the aqueous solution in step (b) exceeds an upper and/or lower limit of such a set range. The upper limit will be process specific and can be determined by the skilled person by means of trial and error and may be a value of −250 mV, more preferably −300 mV and even more preferably −330 mV. The lower value is suitably −405 mV. Suitably the supply of oxygen is increased when the redox potential is lower than −405 mV against an Ag/AgCl 3M KCl reference electrode. This control of oxygen supply will then overrule the control based on oxygen consumption or on the above described ratio. Suitably such an overrule of the control continues until the measured redox potential is within the set range.

In some situations it may happen that the conversion of sulphide to sulphur is not optimal while still operating at the set oxygen consumption or above described ratio and within the optional redox operating window described above. In normal process operation the content of sulphide will be below the detection level of a sulphide measurement such by means of a commercially available amperometry, membrane covered sensor. When the conversion of sulphide is not optimal sulphide may be above such a lower detection level. Preferably if any sulphide is detected in the aqueous solution in step (b) or in an effluent discharged from step (b) the supply of oxygen to step (b) is increased. This control of oxygen supply will then overrule the control based on oxygen consumption or on the above described ratio. Suitably such an overrule of the control continues until no sulphide is measured in the aqueous solution in step (b) or in an effluent discharged from step (b).

Another measure which indicates that the process is not operating optimally is when the content of hydrogen sulphide in the treated gas is measured as it is discharged from the absorption column. If this measure is above a threshold value the supply of oxygen to step (b) may be increased. Especially when other process conditions like alkalinity and/or the flow rate of the aqueous solution are within their normal operating limits. Such a measurement above the threshold value may indicate that the process is not running optimal. This control of oxygen supply may then overrule the control based on oxygen consumption or on the above described ratio. Suitably such an overrule of the control continues until the content of hydrogen sulphide in the treated gas is below the threshold value.

This control of oxygen supply based on oxygen consumption or on the above described ratio may also be overruled when (i) either any sulphide is detected in the aqueous solution in step (b) or in an effluent discharged from step (b) or when (ii) the content of hydrogen sulphide in the treated gas is measured as it is discharged from the absorption column. When such a safety control is combined with the above safety control for redox potential of the aqueous solution it will in practice often be the situation that first the redox potential will be above or below an upper or lower threshold value. If the process does not return to its preferred operating conditions after the resulting control action either hydrogen sulphide will be measured in the treated gas or sulphide will be detected in the aqueous solution resulting in a next final control action to bring the process back to its preferred operating conditions.

Suitably periodically the supply of oxygen to step (b) is increased to achieve a ratio of measured oxygen consumption in step (b) and measured hydrogen sulphide supplied in step (a) of above 0.7 ($O_2/H_2S$ supply ratio). This measure may be repeated at time intervals of between 20 minutes to 10 hours. When the ratio of measured oxygen consumption in step (b) and measured hydrogen sulphide supplied in step (a) reaches a value of above the setpoint of $O_2/H_2S$ supply ratios (mol/mol) the addition of oxygen is suitably continued for between 0 and 10 minutes. After the above time interval this measure is repeated. Such a periodically increase in oxygen supply will temporally overdose the system in oxygen and ensure that no sulphides accumulate in step (b). The drawback of a periodically overdose of oxygen is the temporarily increase of sulphate formation and thus lower selectivity for sulphur formation. This weighs up to the fact that a undesirable build up of dissolved sulfide in step (b) is avoided or at least minimized. Such an undesirable build up of sulfide could result in that the process is underperforming, i.e. the levels of $H_2S$ in the treated gas of step (a) do not meet the required specifications.

The invention will be illustrated by FIG. 1 which shows a process according to the invention. A hydrogen sulphide comprising gas is supplied via line (1) to a absorption column (2). To said column (2) also an aqueous alkaline solution further comprising sulphide oxidising bacteria is supplied via line (3) such that step (a) may be performed in column (2). Via line (5) a loaded aqueous solution comprising bisulphide compounds, sulphide oxidising bacteria and elemental sulphur is discharged from said column (2) and via line (4) a treated gas having a lower content of hydrogen sulphide is discharged from said column. In first bioreactor (6) step (a1) is performed wherein the loaded aqueous solution as supplied via line (5) is kept under anaerobic conditions for at least a time sufficient to lower the concentration of dissolved bisulphide to below 16 mM, preferably below 10 mM and more preferably to below 5 mM. To said first bioreactor (6) an aqueous alkaline solution further comprising sulphide oxidising bacteria is supplied via line (13). In second bioreactor (8) the loaded aqueous solution as discharged from bioreactor (6) via line (7) is contacted with an oxidant as supplied via line (9) to regenerate the sulphide oxidising bacteria by performing step (b) such to obtain a liquid effluent comprising regenerated sulphide oxidising bacteria in line (11). Part of this effluent is supplied to column (2) via line (12) and (3), part of this effluent is directly supplied to first bioreactor (6) and part is supplied to separator (15) wherein precipitated solid elemental sulphur is separated from the effluent to obtain a sulphur-depleted effluent which is recycled to second bioreactor (8) via line (16) and solid elemental sulphur which is withdrawn from the process via line (17). Part of the sulphur-depleted effluent is purged from the process via line (18).

The process may also be performed in a process scheme which does not involve first bio reactor (6) and consequently line (13). Line (5) will then directly supply the loaded aqueous solution to the second bioreactor (8).

When the hydrogen sulphide comprising gas is substantially comprised of hydrogen sulphide optionally in admixture with carbon dioxide a process may be used which does not include a column (2) and does not yield a treated gas (4). In such a process scheme the gas may suitably be directly supplied to a first bioreactor (6) or to the second bioreactor (8) in case the process does not involve a first bioreactor (6).

Figure 3:
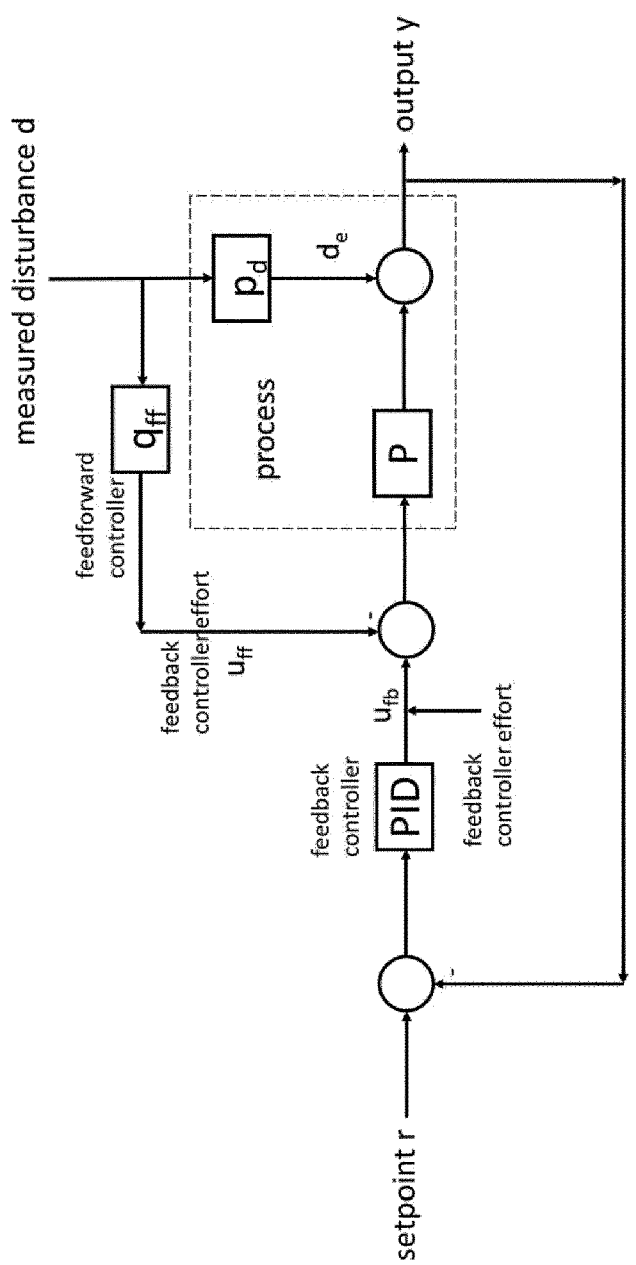

An embodiment of the control of the process according to the present invention may be illustrated making use of FIG. 3. This method of controlling, which involves a combination of a feedforward and feedback control strategy, anticipates on expected perturbations of the sulfide loading rate and in addition control the $O_2/H_2S$ consumption ratio with a feedback control step. In FIG. 3 setpoint (r) is the molar consumption ratio $O_2/H_2S$, y is a measured molar consumption ratio $O_2/H_2S$ (output), d is a measured disturbance in the feed gas, ie a variation of the supply in hydrogen sulphide in the hydrogen sulphide comprising gas to step (a), $q_{ff}$ is a feedforward controller with measured disturbance, PID is a proportional-integral-derivative feedback controller, $p_d$ is a process disturbance induced by d, $d_e$ is the disturbance effect on measured output y, p and pd is the real process to be controlled, $u_{ff}$ is a feedforward control effort as generated by the feedforward controller, $u_{fb}$ is a feedback control effort as generated by the feedback controller and u is the total control effort resulting from the combined feedforward control effort and feedback control effort. In a more simple control strategy the feedforward controller and the resulting feedforward control effort are omitted. The combined system involving feedforward and feedback control is advantageous when major and measurable disturbance affects the process output (y).

The invention shall be illustrated by the following non-limiting examples.

The examples and comparative experiments were performed in a set up as in FIG. 1 consisting of a falling film gas absorber (2), a first bioreactor (6), a second bioreactor, (8) and a recycle (12)(3). The first bioreactor had a volume of 2.5 L, the second bioreactor had a volume of 2.5 L. The total active liquid volume was 5.0 L. The aqueous solution was a haloalkaline solution with a pH of 8.5, buffered with a (bi)carbonate medium having a $Na^+$ content of 1 M. The sulphide oxidising bacteria were a mixture of different bacteria as originating from two commercial biodesulphurization processes and a pilot plant. The amount of hydrogen sulphide as provided to the absorber via (1) was controlled by a 0-17 ml $min^{-1}$ mass flow controller. The amount of oxygen as provided to the second bioreactor (8) via (9) was controlled by a 0-30 ml $min^{-1}$ mass flow controller. The oxygen in the head space of the second bioreactor was measured by a fibre-optic oxygen probe. The temperature of the aqueous solution in the examples was 35° C.

COMPARATIVE EXPERIMENT A

Figure 2:
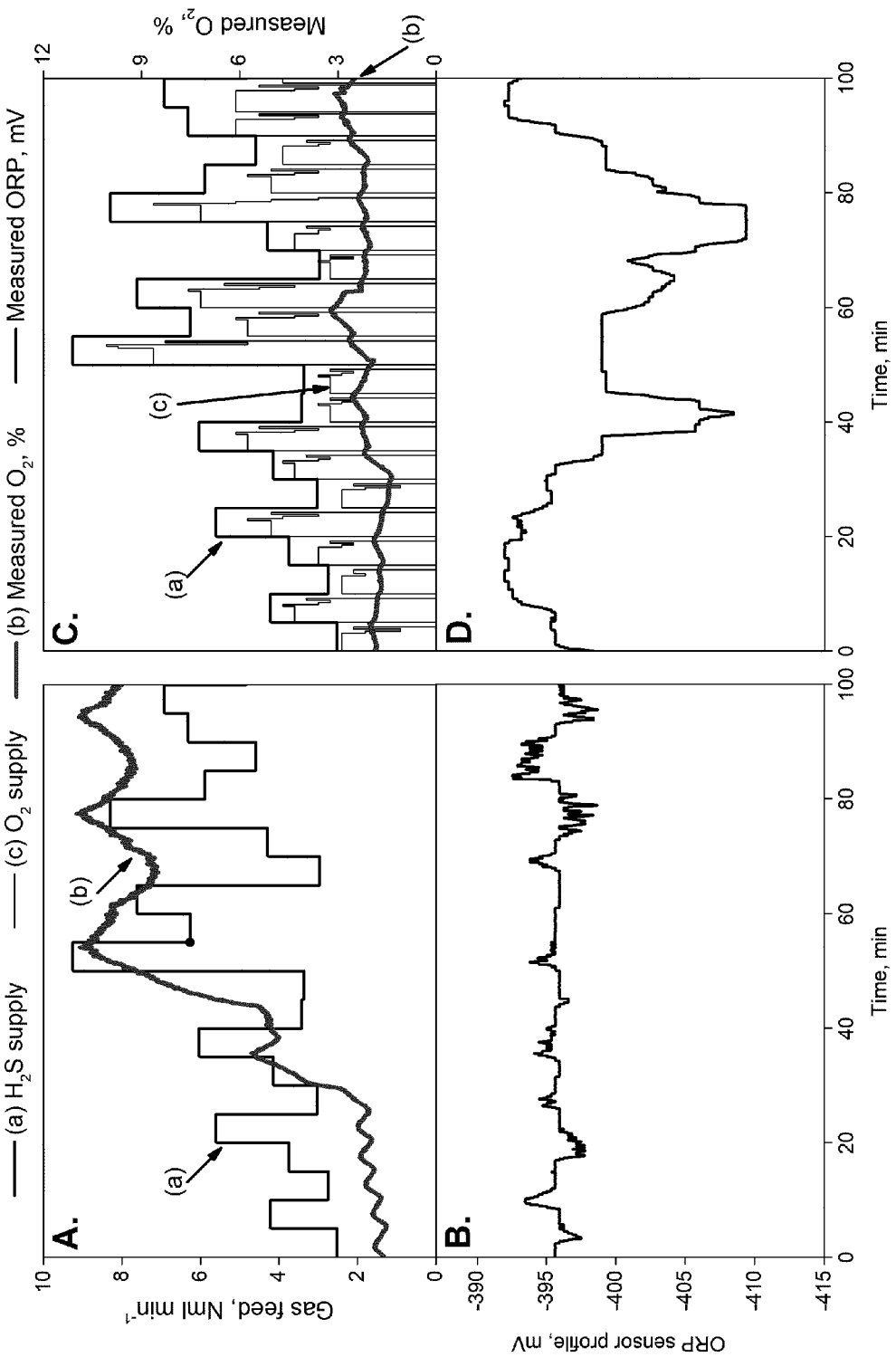

In this experiment the amount of oxygen provided to the second bioreactor (8) via line (9) is controlled by a proportional-integral-derivative (PID) feedback controller on the basis of a continuous redox potential measurement using a sensor, equipped with an internal Ag/AgCl reference electrode (Orbisint 12D-7PA41; Endress+Hauser, Germany). The redox set point was −390 mV. The hydrogen sulphide mass flow (in Nml $min^{-1}$) was varied as shown in FIG. 2A as the blocked "line a". In FIG. 2A it is shown that the measured oxygen in the head space of the second bioreactor increases over time (line b). In FIG. 2B a more or less stable redox potential (ORP sensor profile, mV) is seen which may be expected for a process which is controlled on a redox potential measurement.

The average product selectivity for $SO_4^{2-}$ was 44 wt % and to elemental Sulphur ($S_8$) was 56 wt %.

COMPARATIVE EXPERIMENT B

Experiment A was repeated except that the supply of hydrogen sulphide was constant at 2.5 ml $min^{-1}$. The average product selectivity for $SO_4^{2-}$ was 6 wt %, 2 wt % $S_2O_3^{2-}$ and to elemental Sulphur ($S_8$) was 92 wt %. Experiments A and B show that a control based on redox potential may result in high product selectivity's to elemental sulphur at more or less constant hydrogen sulphide supply conditions. However the selectivity may drop significantly when the hydrogen sulphide supply varies in time.

EXAMPLE 1

Comparative Experiment A was repeated except that the flow of oxygen was controlled by the method according to the invention. In this example the oxygen consumption ($O_2$ in minus $O_2$ out) is kept at a fixed ratio to the hydrogen sulphide supply at 0.63 ($O_2/H_2S$ consumption ratio). In FIG. 2C the varying hydrogen sulphide supply is seen which is the same as in Comparative Experiment A (line a). FIG. 2C shows how the oxygen consumption (line c) follows the varying hydrogen sulphide supply (higher blocked line) such to achieve the required fixed ratio. The same FIG. 2C also shows the oxygen content of the gas (line b; Measured $O_2$, %) being discharged from the second bioreactor (8) as steam (10). The almost constant value of this oxygen content of just below 3% in the gas being discharged is proof that also this measured value may be used to control the supply of oxygen to step (b). The redox potential was also measured and shown in FIG. 2D. FIG. 2D shows a large variation of the redox potential between −390 mV and −410 mV.

The average product selectivity to $SO_4^{2-}$ was 3 wt % and to elemental Sulphur ($S_8$) was 97 wt %.

EXAMPLE 2

Example 1 was repeated except that also some ethanethiol was present in the gas as supplied to the absorber. The supply of ethanethiol was varied between 0.8 and 1.16 mM S $day^{-1}$. The process was controlled using the same ratio as in Example 1. The average product selectivity to $SO_4^{2-}$ was 4 wt % and to elemental Sulphur ($S_8$) was 96 wt %.

Examples 1 and 2 show that a biodesulphurisation process can be controlled in a more improved manner resulting in higher product yields when the supply of hydrogen sulphide varies. Example 1 and FIG. 2D show that the process can still be successfully controlled when the redox potential varies between −390 and −410 mV. Further, example 2 shows that the process with the proposed $O_2/H_2S$ consumption ratio is robust when also thiol compounds are present in the gas feed.

The invention claimed is:

1. A continuous process to treat a hydrogen sulphide comprising gas comprising the following steps:
   (a) contacting the hydrogen sulphide comprising gas with an aqueous alkaline solution further comprising sulphide oxidising bacteria thereby obtaining a loaded aqueous solution comprising sulphide compounds and sulphide oxidising bacteria,
   (b) contacting the loaded aqueous solution with an oxygen comprising gas to regenerate the sulphide oxidising bacteria to obtain a liquid effluent comprising regenerated sulphide oxidising bacteria which is partly used as the aqueous alkaline solution in step (a), and
   (c) separating elemental sulphur as prepared by the sulphide oxidising bacteria in steps (a) and (b) from the loaded aqueous solution of step (a) and/or from the liquid effluent of step (b);
   wherein the consumption of oxygen in step (b) is measured and wherein the supply of oxygen in step (b) is controlled by the measured consumption of oxygen.

2. The process according to claim 1, wherein the oxygen comprising gas is air and wherein the consumption of oxygen in step (b) is measured by measuring the oxygen content in a gas flow as discharged from step (b).

3. The process according to claim 1, wherein the supply of hydrogen sulphide as present in the hydrogen sulphide comprising gas is measured such that a ratio of oxygen consumption in step (b) and hydrogen sulphide supplied in step (a) is determined as the molar supply ratio and wherein the supply of oxygen in step (b) is controlled such that this molar supply ratio is a value of between 0.4 and 0.8.

4. The process according to claim 3, wherein the supply of oxygen in step (b) is controlled such that this molar supply ratio is a value of between 0.5 and 0.7.

5. The process according to claim 1, wherein the hydrogen sulphide comprising gas further comprises thiol compounds.

6. The process according to claim 1, wherein the measured supply of hydrogen sulphide in the hydrogen sulphide gas comprising gas varies over a time period of 32 hours at least between plus 20% and minus 20% relative to the average supply in that period.

7. The process according to claim 1, wherein after performing step (a) and before performing step (b) the loaded aqueous solution is kept in a step (a1) under anaerobic conditions for at least a time sufficient to lower the concentration of dissolved bisulphide to below 5 mM.

8. The process according to claim 1, wherein the concentration of molecular oxygen in the aqueous solution in step (a) and optional step (a1) is at most 1 µM.

9. The process according to claim 1, wherein step (a) is performed in a vertical column wherein continuously the hydrogen sulphide comprising gas is fed to the column at a lower position of the column and the aqueous solution comprising sulphide oxidising bacteria is continuously fed to a higher position of the column such that a substantially upward flowing gaseous stream contacts a substantially downwards flowing stream and wherein a treated gas having a lower content of hydrogen sulphide is obtained.

10. The process according to claim 1, wherein the aqueous solution comprising sulphide oxidising bacteria is a buffered solution comprising sodium carbonate and sodium bicarbonate or potassium carbonate and potassium bicarbonate or their mixtures.

11. The process according to claim 1, wherein the supply of oxygen in step (b) is controlled by a measured redox potential of the aqueous solution in step (b) when the redox potential exceeds an upper and/or lower limit.

12. The process according to claim 11, wherein the supply of oxygen is increased if the redox potential is lower than −405 mV against an Ag/AgCl reference electrode.

13. The process according to claim 1, wherein sulphide is measured in the aqueous solution in step (b) or in an effluent discharged from step (b) and wherein the supply of oxygen to step (b) is increased when sulphides are detected.

14. The process according to claim 9, wherein the content of hydrogen sulphide in the treated gas is measured and wherein the supply of oxygen to step (b) is increased when an increase in hydrogen sulphide above a threshold value in the treated gas is measured.

15. The process according to claim 3, wherein periodically the supply of oxygen to step (b) is increased to achieve a ratio of measured oxygen consumption in step (b) and measured hydrogen sulphide supplied in step (a) of above 0.7 (mol/mol).

* * * * *